Dec. 26, 1933.     H. A. CAMPBELL     1,940,743
BOX LINING MACHINE
Filed May 23, 1932     10 Sheets-Sheet 2

Inventor
Henry A. Campbell
By Lyon & Lyon
Attorneys

Dec. 26, 1933.  H. A. CAMPBELL  1,940,743
BOX LINING MACHINE
Filed May 23, 1932  10 Sheets-Sheet 3

Inventor
Henry A. Campbell
By Lyon Lyon
Attorneys

Dec. 26, 1933.       H. A. CAMPBELL       1,940,743
BOX LINING MACHINE
Filed May 23, 1932        10 Sheets-Sheet 4

Inventor
Henry A. Campbell
By Lyon & Lyon
Attorneys

Dec. 26, 1933.  H. A. CAMPBELL  1,940,743
BOX LINING MACHINE
Filed May 23, 1932   10 Sheets-Sheet 5

Inventor
Henry A. Campbell
By Lyon & Lyon
Attorneys

Dec. 26, 1933.  H. A. CAMPBELL  1,940,743
BOX LINING MACHINE
Filed May 23, 1932  10 Sheets-Sheet 6

Inventor
Henry A. Campbell
By Lyon & Lyon
Attorneys

Dec. 26, 1933.  H. A. CAMPBELL  1,940,743
BOX LINING MACHINE
Filed May 23, 1932   10 Sheets-Sheet 7

Inventor
Henry A. Campbell
By Lyon & Lyon
Attorneys

Dec. 26, 1933.   H. A. CAMPBELL   1,940,743
BOX LINING MACHINE
Filed May 23, 1932   10 Sheets-Sheet 8

Inventor
Henry A. Campbell
By Lyon & Lyon
Attorneys

Dec. 26, 1933.  H. A. CAMPBELL  1,940,743
BOX LINING MACHINE
Filed May 23, 1932  10 Sheets-Sheet 9

Inventor
Henry A. Campbell
By Lyon & Lyon
Attorneys

Dec. 26, 1933.  H. A. CAMPBELL  1,940,743
BOX LINING MACHINE
Filed May 23, 1932  10 Sheets-Sheet 10

Inventor
Henry A. Campbell
By Lyon & Lyon
Attorneys

Patented Dec. 26, 1933

1,940,743

UNITED STATES PATENT OFFICE 1,940,743

BOX LINING MACHINE

Henry A. Campbell, San Jose, Calif., assignor to California Packing Corporation, San Francisco, Calif., a corporation of New York Application May 23, 1932. Serial No. 612,972

21 Claims. (Cl. 93—36)

This invention relates to a machine for placing of linings or paper in boxes or containers and is more particularly directed to a machine for the automatic placing of paper wrappings in boxes to be packed with dried fruit such, for example, as prunes, apricots, or the like, wherein the lining of the box is used as a covering for the dried fruit.

In the packing of the dried fruit it has heretofore been the practice to line boxes by hand with paper so that the ends of the paper might be utilized to fold over the top of the fruit packed in the boxes to cover the upper portion of the fruit before the cover or lid was applied to the box.

As the paper is applied by hand, it is impossible to obtain a uniform result so that as the fruit which is placed in the boxes in weighed quantities is discharged into the boxes and pressed therein, the paper is many times pulled into the box by the delivery of the fruit therein so that the lining of a box is destroyed and the intended overhang of the paper used for lining the boxes is so pulled into the boxes by the delivery of fruit thereto as to leave no paper to cover the upper surface of the fruit as packed in the box.

The hand placing of the paper in the boxes as heretofore followed is not only expensive, but ineffective.

It is therefore an object of this invention to provide a machine which may be utilized for the packing of fruit boxes which are subsequently to be filled with dried fruit or the like and which machine is adapted to uniformly place the paper in the boxes so that the lower extent of the paper will lie flat to the bottom of the box, and so that a uniform overhang of the paper at the ends and sides of the box will at all times be maintained so as to permit the overhanging portions of the paper to be folded over the upper surface of the fruit as packed in the box.

Another object of this invention is to provide a machine for the automatic lining of paper in boxes to cover the inner surface of the boxes, both the sides, ends and bottoms thereof, and which machine so places the paper in the boxes as to maintain at all times an adequate overhang of paper at the ends and sides of the boxes to permit the folding of this paper over the upper surface of the packed fruit.

Other objects and advantages of this invention it is believed will be apparent from the following detailed description of a preferred embodiment thereof as illustrated in the accompanying drawings.

In the drawings:

Figure 18 is an elevation of the cutting means.

In the preferred embodiment of my invention as illustrated in the accompanying drawings, 1 indicates the table upon which boxes 2 are adapted to be placed and the boxes 2 are intermittently moved over the surface of the table 1 by means of an intermittently operated conveyor or advancing means through two stations at one of which stations paper is placed within the boxes 2 longitudinally thereof, while at the second station the paper is placed in the boxes transversely thereof.

The machine embodying my invention includes a number of primary elements which are the intermittent conveyor 3, the paper holding element 4, paper advancing or position element 5, paper placing element 6, a paper cutting element 7, and a driving element or unit 8. The elements as thus set forth constitute the elements for placing the paper in the boxes in one direction, and these elements, including elements 4, 5, 6 and 7, are duplicated at the two stations on the conveyor 3. As the construction of these elements at the two stations is substantially identical, it is believed it will suffice for a complete understanding of this invention to describe the construction and mode of operation of these elements as they are utilized for the placing of the paper in the boxes in only one direction of the boxes.

Figure 1:
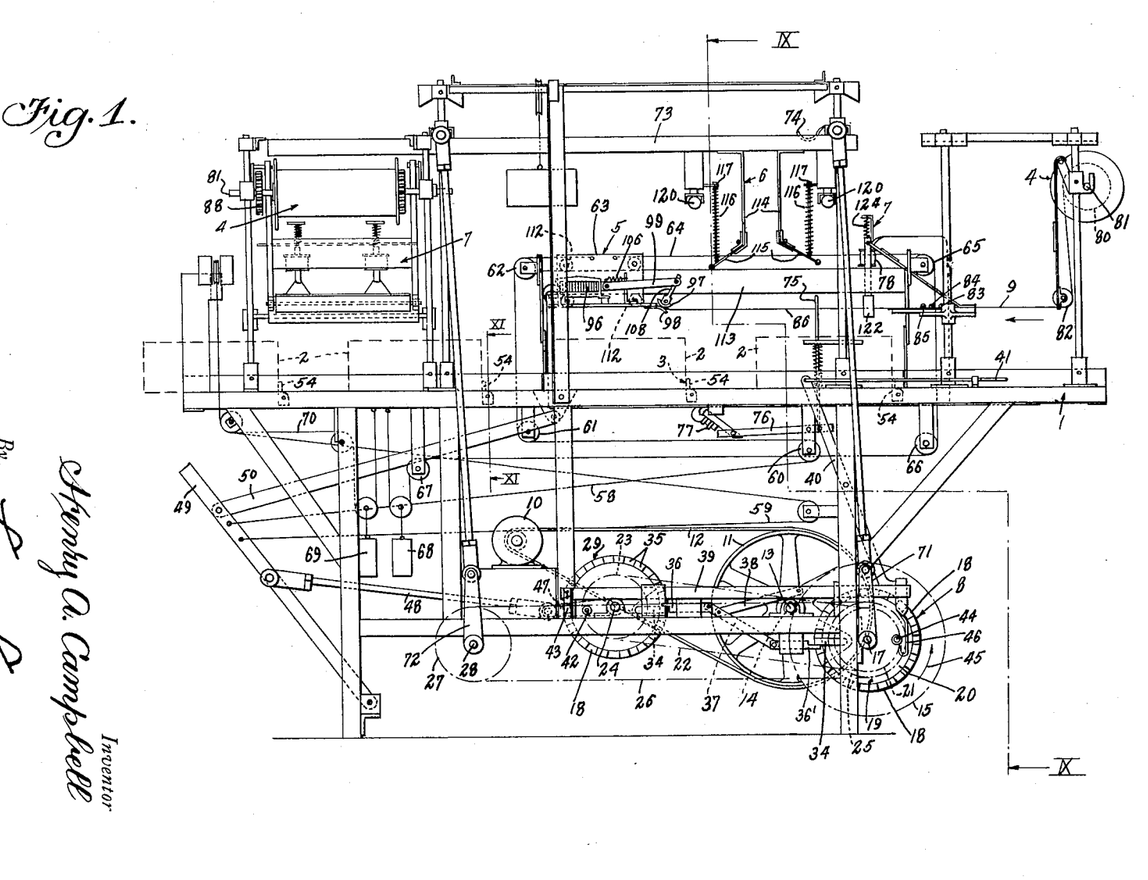
Figure 1 is a side elevation of a paper placing machine embodying my invention.
Figure 2:
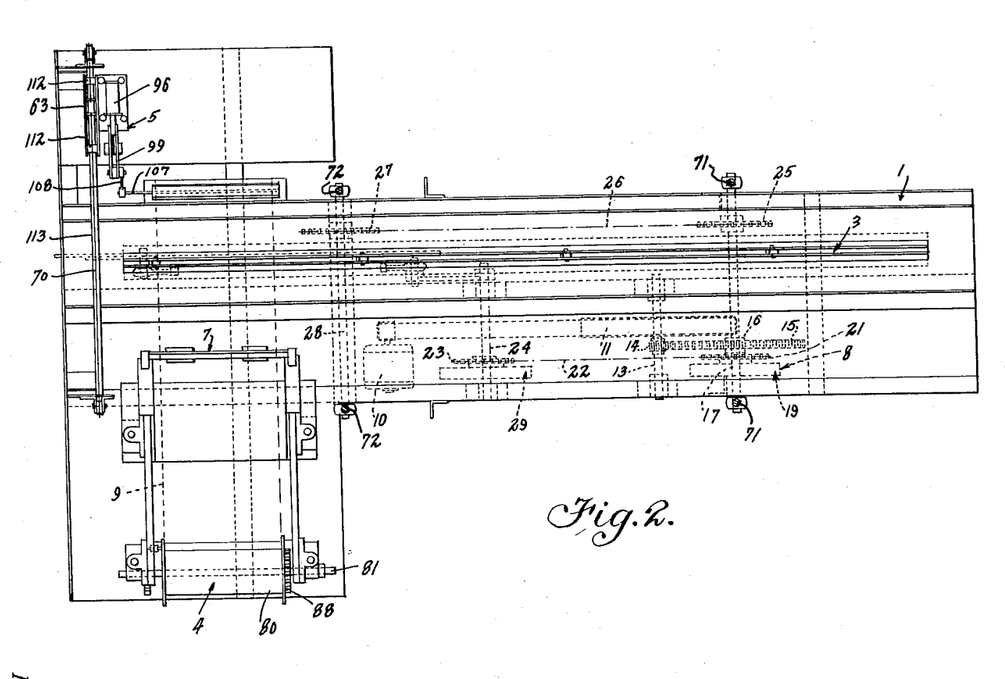
Figure 2 is a plan view of the table thereof, illustrating placing means for placing the paper transversely of the boxes in position over the table.
Figure 3:
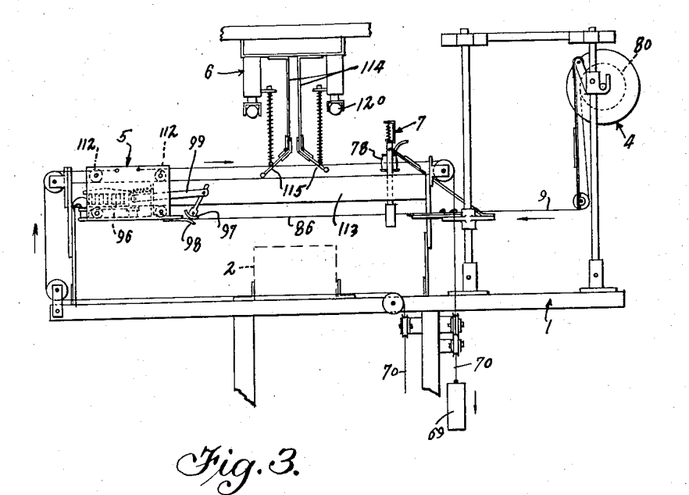
Figure 3 is a detached side elevation of the paper placing means embodying my invention.
Figure 4:
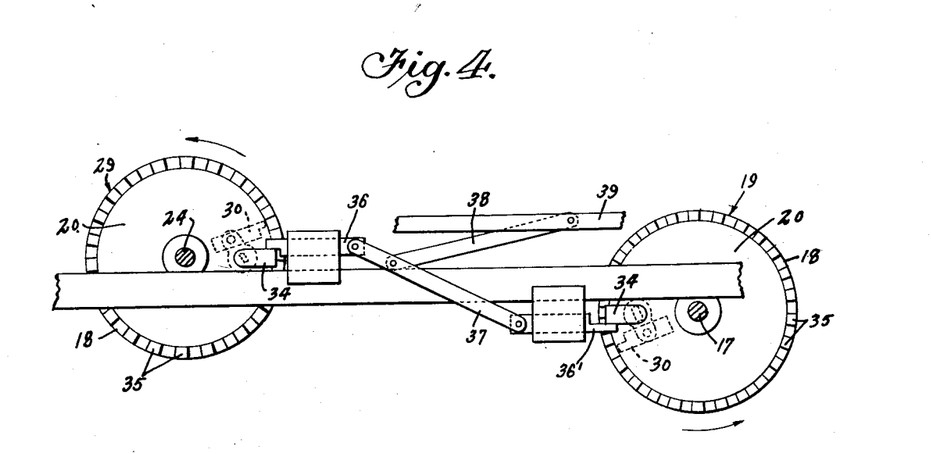
Figure 4 is an enlarged detail clutch mechanism embodied in my invention.

The boxes 2 are placed on the conveyor 3 and are moved intermittently in timed relation over the table 1 so that the boxes come to rest on the table 1 below both paper placing means 6. With the boxes thus positioned, the paper advancing means 5 travels to the right, as viewed in Figure 1, to grip the paper as held by the paper holding means 4, and then returns to the position as illustrated in Figure 1 with the paper 9 stretched over the upper open face of the box 2. With the paper thus held, the paper placing means 6 moves downwardly to position the paper within the box 2.

The paper as stretched over the box 2 between the holding means 4 and the advancing means 5 is of sufficient length to permit its placing in the box to cover the bottom of the box, the ends or sides of the box, and to overhang the ends or sides of the box a distance substantially equal to the height of the box to permit the folding of these overhanging ends of the paper over the exposed surface of the fruit after the fruit has been packed into the lined boxes.

The paper is positioned within the box 2 by the means 6 and is folded into the corners and over the upper edges thereof by the means 6, so that the paper will remain in position during the subsequent packing of the boxes.

As the paper is placed in the box, and prior to its being folded to the corners and edges thereof, the paper cutting means 7 is actuated to cut the paper to its proper length. The box 2, being thus lined with paper in one direction is moved intermittently to the second station of the conveyor 3 where the operation is repeated to place paper transversely of the box so that the paper overhangs the sides thereof in the same manner as it does the ends and for the same purpose.

The driving unit 8 consists of a motor 10 which drives a pulley 11 by means of a belt 12. The pulley 11 is secured to a shaft 13 mounted transversely of the frame. Secured to the shaft 13 is a pinion 14 which drives a gear 15. The gear 15 is secured to a clutch sleeve 16 which is journaled upon the shaft 17. Secured to the sleeve 16 is a clutch drive ring 18 of a clutch 19. A driven clutch ring 20 is keyed to the shaft 17. A sprocket 21 is secured to the sleeve 16 and drives by means of a chain 22 and a sprocket 23 secured to a clutch sleeve mounted on a shaft 24. The clutch sleeve carries a drive ring similar to the drive ring 18 of the clutch 19, and a driven clutch ring is keyed to the shaft 24. This clutch ring is similar to the clutch ring 20. The shaft 24 is journaled in bearings transversely of the frame.

Secured to the shaft 17 is a sprocket 25 which is connected by means of a chain 26 with a sprocket 27 mounted upon a shaft 28 journaled transversely of the frame. The clutch mounted on the shaft 24 is the clutch 29. The clutches 19 and 29 are each one revolution clutches, and are of the same construction so that the construction of only one of these clutches need be described. The constructions of these clutches are illustrated in Figures 4, 6, 7 and 8.

Figure 8:
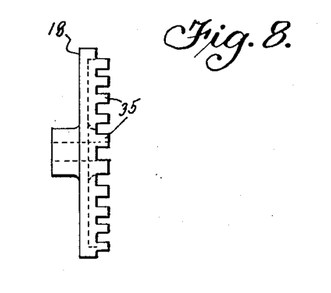
Figure 8 is a side elevation of the clutch drive ring.

The driven clutch ring 18 as illustrated in Figure 8 is journaled on the shaft 17 on the clutch sleeve 16, to which sleeve the ring 18 and the gear 15 are secured. The driven clutch ring 20 is keyed to the shaft 17. A clutch dog 30 is carried by the clutch ring 20 and is normally urged into clutch-engaging position by means of a spring 31. A link 32 is journaled upon a pin 33 secured to the clutch locking dog 30 at one end and at its opposite end is secured to an actuating arm 34. When the dog 30 is urged outwardly by the spring 31, it engages between the teeth 35 of the driving clutch ring 18 connecting together the two clutch elements 18 and 19 so that they are driven in unison.

The clutch actuating arms 34 of the clutches 19 and 29 are adapted to be engaged by locking dogs 36 and 36' to hold these clutches from rotation after they have rotated through one revolution. The locking dogs 36 and 36' are linked together by means of a link 37 so that when one dog 36 is moved out of engagement from the actuating arm 34 of the clutch 29 to permit the clutch 29 to operation through one revolution, the locking dog 36' is moved into engagement to hold the other clutch 19 from operative rotation.

In order to actuate the locking dogs 36 and 36', the link 37 is connected by means 38 with an operating lever 39. The lever 39 is in turn connected by means of a lever 40 with the operating handle 41. On the face of the ring 20 of the clutch 29 is mounted a roller 42, which, just before the clutch 29 completes its revolution, engages a stop piece 43 secured to the lever 39 so that as the clutch 29 completes its revolution, the lever 39 is moved to a position to cause the lock dog 36 to be moved into position to arrest further rotation of the clutch 29, and likewise moving the lock dog 36' from engagement with the arm 34 so as to release the clutch 19 so that the clutch 19 may make a revolution.

Mounted on the face of the ring 20 of the clutch 19 is a roller 44 which, as the clutch 19 completes its rotation in the direction of the arrow 45, the roller 44 engages an arm 46 to move the lever 39 back to a neutral position where both the stop dogs 36 and 36' are engaged with their corresponding levers 34 to stop rotation of both clutches 19 and 29. When both clutches are stopped, it is necessary to actuate the handle 41 to set the machine again into operation. If this handle 41 is held either by means of a spring, rope, or by the operator in operating position, the clutch operation just described will be continuous so that the drive of the machine will be continuous.

Figure 11:
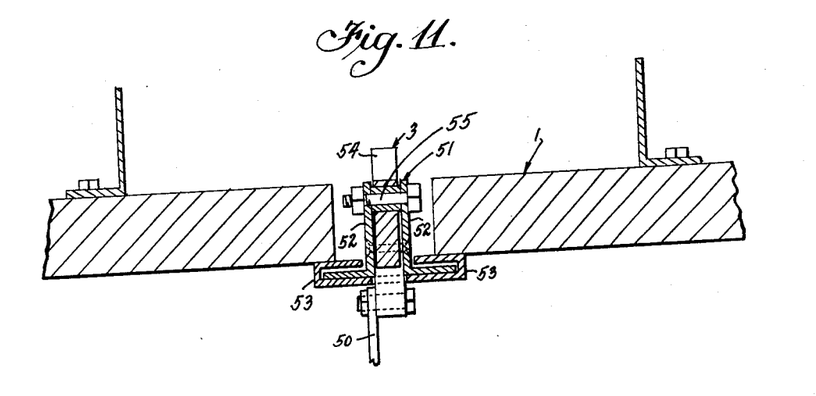
Figure 11 is an enlarged fragmental sectional end view of the box advancing means embodied in my invention.
Figure 12:
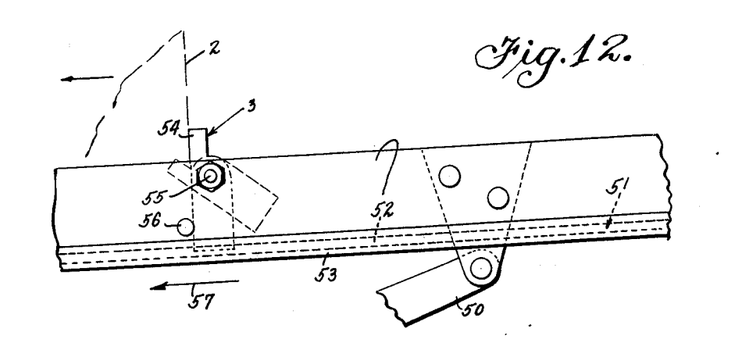
Figure 12 is a side elevation thereof.
Figure 13:
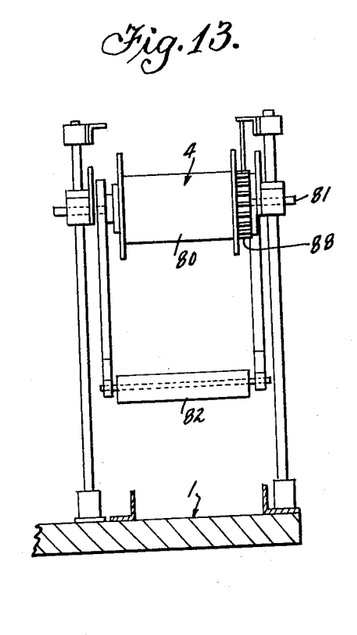
Figure 13 is a detached end elevation of the paper holding means.
Figure 15:
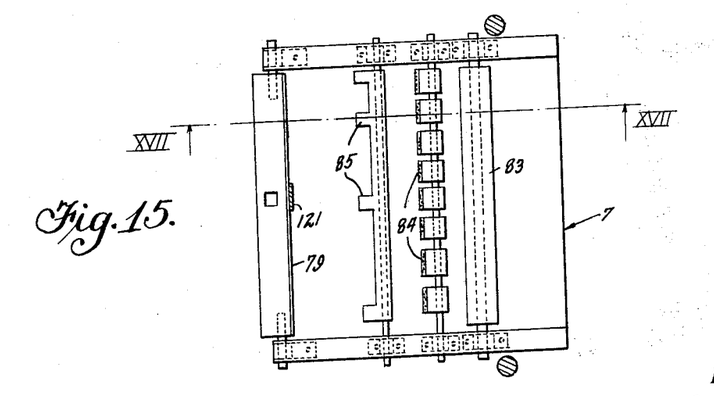
Figure 15 is a plan view of the paper holding and cutting means.
Figure 16:
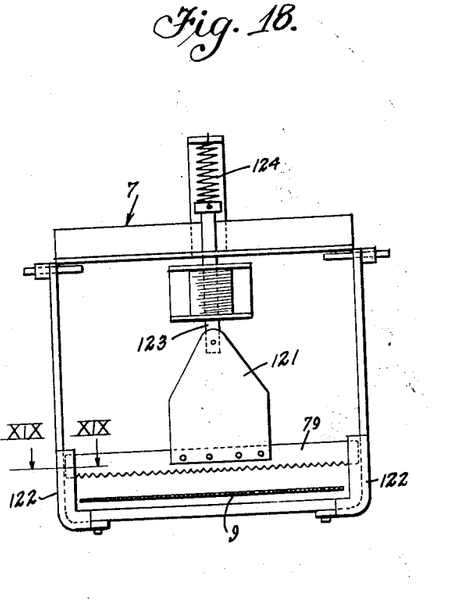
Figure 16 is a detached side elevation of the paper feed and cutting means.
Figure 17:
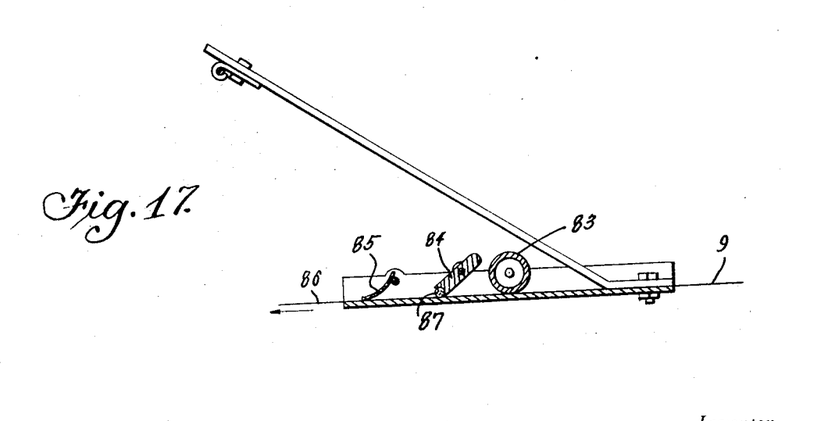
Figure 17 is a sectional view taken substantially on the line XVII—XVII of Figure 15.
Figure 19:
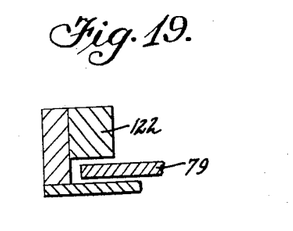
Figure 19 is a section taken substantially on the line XIX—XIX of Figure 18.
Figure 20:
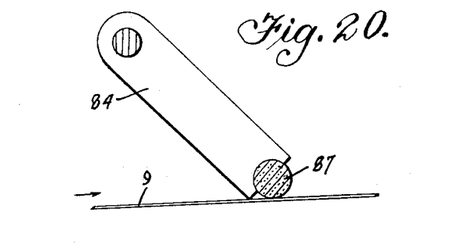
Figure 20 is a detached view of the paper holding means of the paper feeding mechanism.
Figure 21:
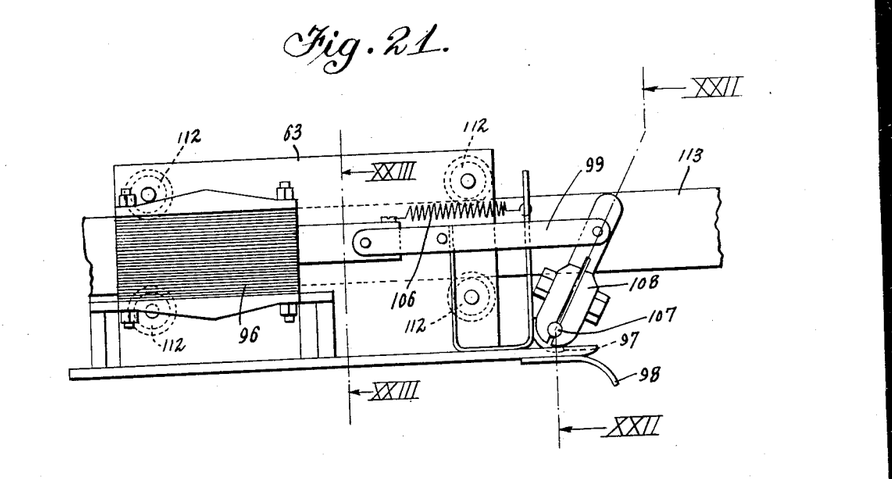
Figure 21 is a detached elevation of the paper advancing means.
Figure 22:
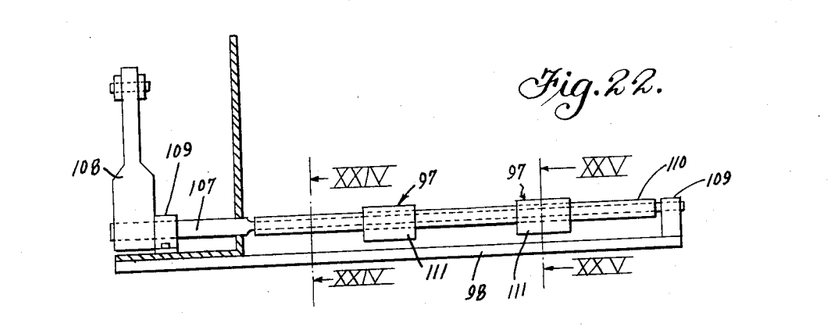
Figure 22 is a sectional view taken substantially on the line XX—XX of Figure 21.
Figure 23:
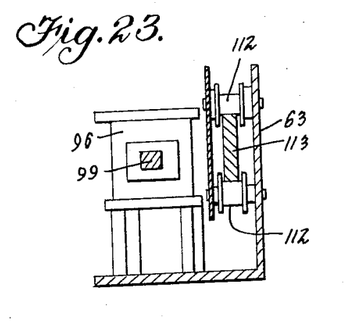
Figure 23 is a sectional view taken substantially on the line XXIII—XXIII of Figure 21.
Figure 24:
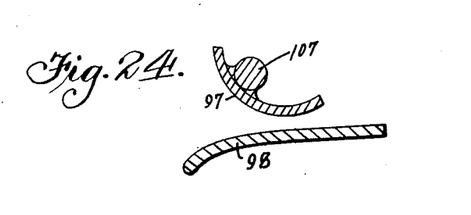
Figure 24 is a sectional view taken substantially on the line XXIV—XXIV of Figure 22.
Figure 25:
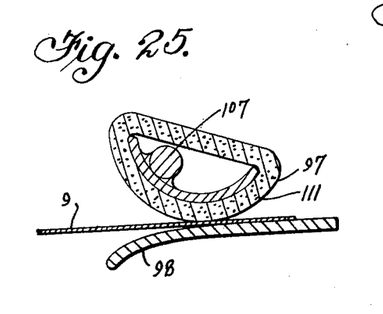
Figure 25 is a sectional view taken substantially on the line XXV—XXV of Figure 22.

When the clutch 29 is operated through one revolution, it turns the shaft 24 through one revolution. Secured to the shaft 24 is a crank 47 which is secured by means of a link 48 to an arm 49. The arm 49 is secured by means of a link 50 to a carrier rack 51, thus the carrier rack 51 is caused to reciprocate to and fro within the table 1 within which it is mounted, (Figure 11).

The carrier rack 51 consists of a pair of angle irons 52 which are secured together and are mounted within guides 53 secured to the table 1. Secured to the carrier rack 51 at points spaced along its length are carrier dogs 54. The carrier dogs 54 are secured to the carrier rack 51 on pivots 55, so as to rotate between the angle irons 52. A stop pin 56 is mounted to arrest rotation of the carrier dogs 54 in one direction. As the carrier rack 51 is reciprocated under the boxes 2 mounted on the table 1, carrier dogs 54, as they move in the direction of the arrow 57, engage the rear edge of the boxes 2 to move the boxes 2 forward through the distance of travel, or approximately the distance of travel, of the rack 51. As the rack 51 moves in the opposite direction, dogs 54, coming into engagement with the front of the box, pivot upon their pivot 55 and slide under the boxes 2 to the rear thereof so that on their next movement forward they engage the succeeding box on the table 1.

By this means the boxes 2 are moved over the table 1 intermittently and are positioned on the table 1 in proper relation below the paper placing mechanisms 6.

As the arm 49 is reciprocated to operate the rack 52 to move the boxes 2 intermittently over the table 1, it likewise operates the paper advancing means 5 of both the longitudinal and transverse paper feeds through the cables 58 and 59. The cable 58 passes over the pulleys 60, 61 and 62, and is secured to the carriage 63 of the paper placing means 5. A counterweighting or return cable 64 is likewise secured to the carriage 63 and passes over pulleys 65, 66 and 67, and supports a returning weight 68. As the arm 49 moves to the right, as viewed in Figure 1, the weight 68, operating through the cable 64, pulls the carriage 63 over to a paper holding element 4, and the paper advancing element 5 grips the paper 9. As the arm 49 moves then to the left, the carriage 63 is returned to the left and pulls the paper 9 over the box 2, which is then being positioned immediately below the paper placing element or mechanism 6. The same operation at the same time is performed through the cable 59 and the corresponding weight 69 attached to the return cable 70 for the carriage 63 of the paper advancing element or mechanism 5 of the transverse paper placing element.

Figure 26:
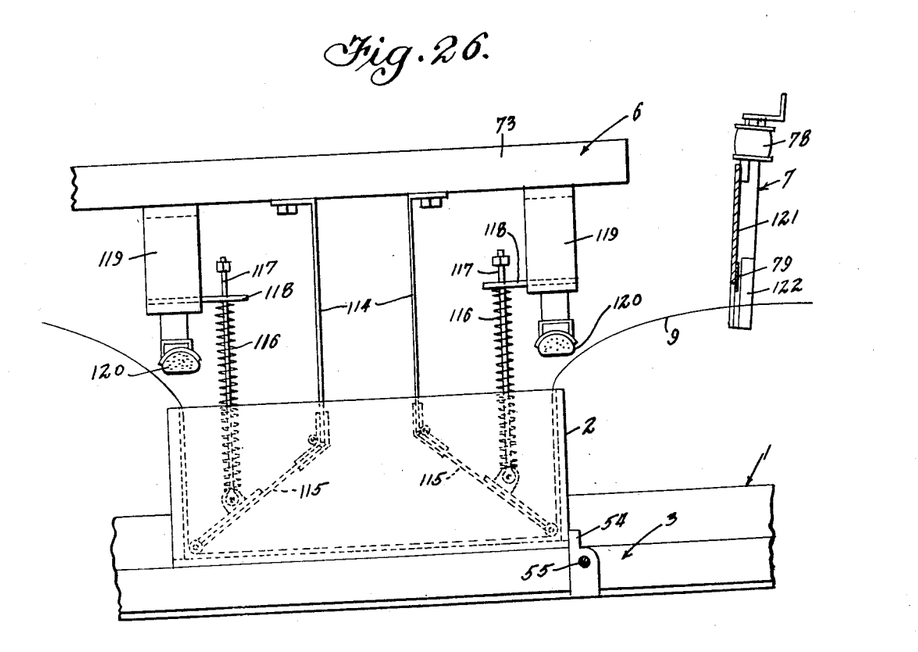
Figure 26 is an enlarged detail view of the paper placing means illustrating the same as in position when placing the paper within a box just prior to the cutting of the paper to its proper length.
Figure 27:
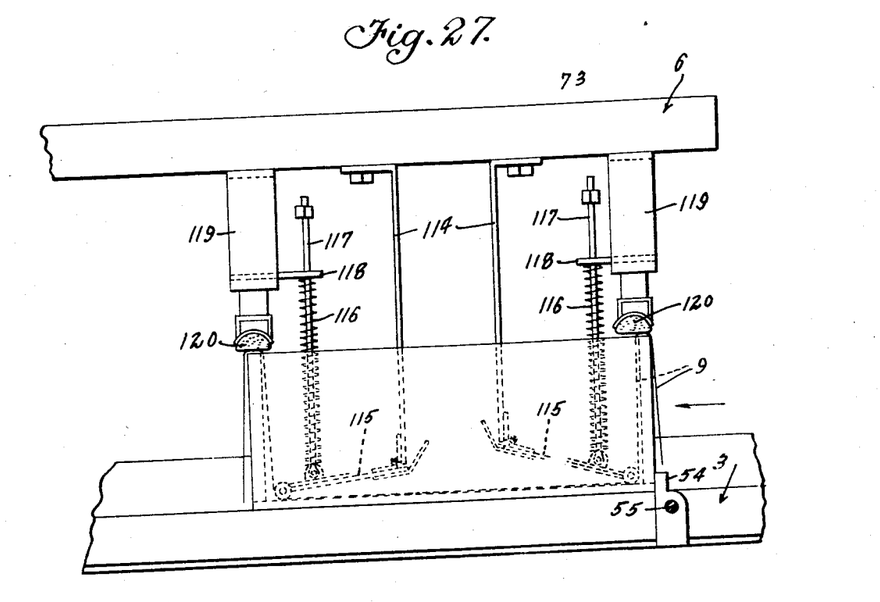
Figure 27 is a further detached elevation of a paper placing means illustrating the same in the position after the paper has been cut and as folding the paper at the corners and edges of the box and to provide for the overhang of the paper at the ends or sides of the box.

A complete revolution of the clutch 29 having been made, clutch 29 is stopped in its revolution in the manner heretofore described, and the clutch 19 is set in operation. As the clutch 19 operates through one revolution, it operates cranks 71 and 72 secured to the shafts 17 and 28 respectively causing the paper placing carriage 73 to be moved downwardly to position the paper within the boxes 2 in the manner as illustrated in Figures 26 and 27 and which will hereinafter be described.

As the carriage 73 comes downward to place the paper in the box 2, actuating fingers 74, carried by the carriage 73, engage switch arms 75 operating through links 76 to complete the electric circuit through a mercoid switch 77. Mercoid switch 77 is electrically connected with a solenoid 78 carried by the paper cutting unit 79 and the solenoid 78, as the current is applied through, forces the paper cutting knife 79 downward to cut off the paper 9 to the correct length. The same structure of paper cut-off is used for both the longitudinal and transverse paper placing means.

In the manner as thus described, the paper is stretched over the tops of the boxes 2 to a sufficient length to permit the paper being folded within the boxes to the corners thereof and to provide for a sufficient overhang over the ends and sides of the boxes so that when the paper is cut and folded into position, as will be hereinafter described, the paper lies flat to the bottom of the boxes, to the sides and ends thereof, and is folded over the upper edge permitting the packing of the fruit within the boxes without crinkling or crushing the paper within the box, leaving the overhanging paper in position to be folded over the top or exposed surface of the fruit before the cover of the box is applied thereto.

The paper holding means 4 includes a roll of paper 80 which is supported in a shaft 81, and the paper 9 thereof passes over a roller 82 and is gripped by a gripping means including guide roller 83 and rubber-tipped back slip member 84 and guide fingers 85 which are provided for the purpose of maintaining a projecting end 86 of the paper after the paper has been sheared by the knife 79, so that as the paper advancing means advances, the projecting end of the paper 86 will be in position to be gripped by said advancing means. The rubber-tipped element 84 includes a rubber cylinder 87 which is adapted to lie against the surface of the paper 9 to prevent the same from slipping back after the paper has been cut off.

Figures 9, 10, 14:
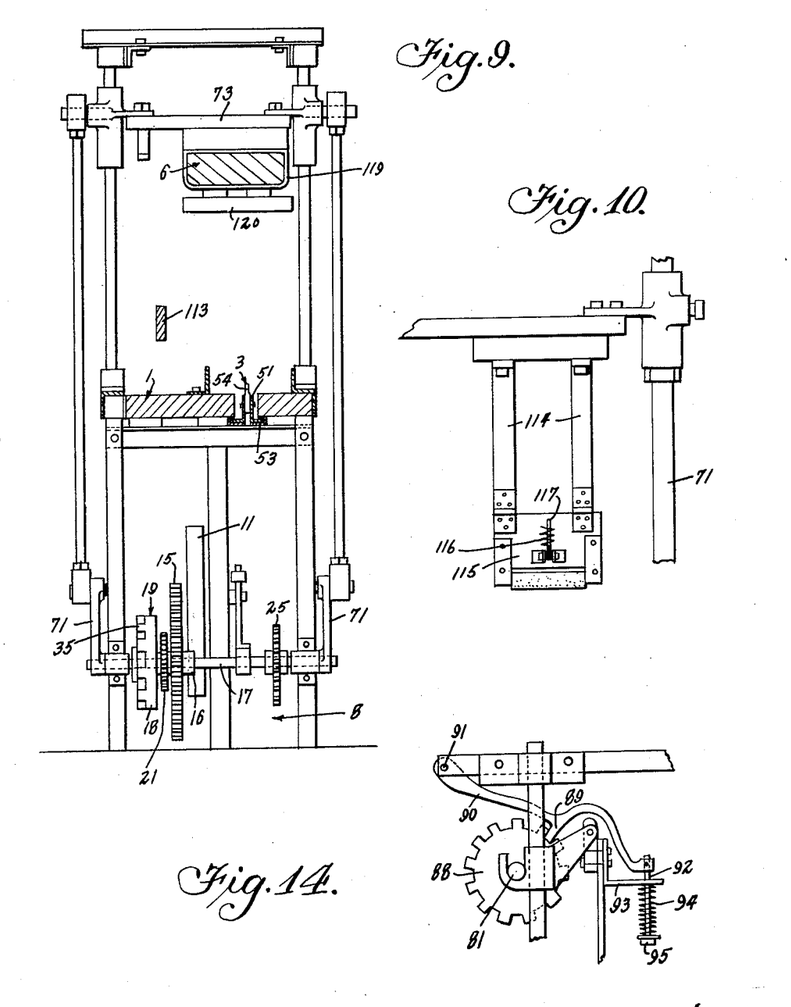
Figure 9 is a sectional end elevation taken substantially on the line IX—IX of Figure 1.
Figure 10 is a fragmental end elevation of one of the paper holders embodied in my invention.
Figure 14 is a detached detail view of the ratchet means for the paper holder.

In order to prevent rewinding of the paper after it has been cut by the knife 79, and due to the fact that the paper is held in tension by the paper advancing means 5, the paper roller 80 is provided with a ratchet device which will permit the paper to unroll but not reroll. This ratchet device may be of any suitable construction as illustrated, for example, in Figure 14, and includes a ratchet 88 which is secured to the paper shaft 81. The pawl 89 is secured to a lever 90 which is pivoted by the pin 91 to the frame of the paper holder at one end and at its opposite end is connected to a spring rod 92. The rod 92 passes through a plate 93 and a spring 94 is mounted on the rod 92 between the plate 93 and an adjustment nut 95 threaded to the end of the rod 92.

Paper advancing elements 5 are advanced over by the cable, for example, the cable 64, to grip the projecting end 86 of the paper knife. The gripping means provided on the carriage 63 includes a solenoid 96 which is secured to the carriage 63 and is actuated by a mercoid switch. The mercoid switch for the paper advancing means operates to complete the circuit to the solenoid 96 so that the paper is held tight until the current is interrupted.

Figure 5:
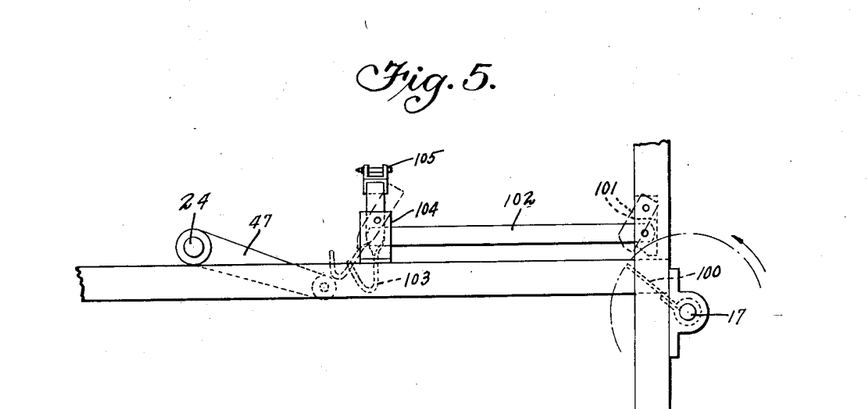
Figure 5 is an enlarged detail of the means provided for opening and closing the paper holders.
Figure 6:
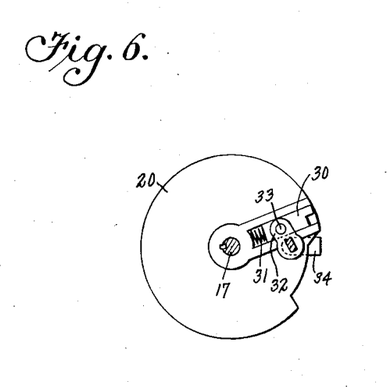
Figures 6 and 7 are enlarged elevations of the reverse sides of a driven clutch ring embodying my invention.
Figure 7:
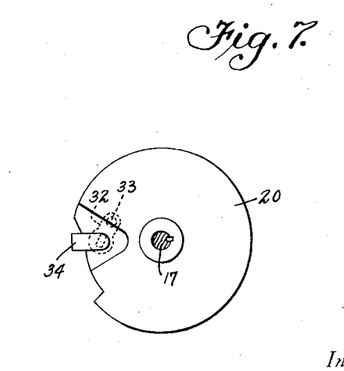

This switch is operated in timed relation so that when the gripping jaws 97 and 98 pass over the end 86 of the paper 9, they are brought together through the solenoid 96 acting through the link 99 and actuating the movable jaw 97 in position to clamp the paper between the jaw 97 and the jaw 98. The mercoid switch actuating the solenoid switch 96 is operated by means as illustrated in Figure 5.

Secured to the shaft 17 is an arm 100, and secured to the frame by means of a link 101 is an arm 102. Secured to the opposite end of the arm 102 is a switch arm 103 which is pivoted to a bracket 104 mounted on the frame, and is likewise pivotally secured to the arm 102. As crank 47 approaches the completion of its first 180° of revolution, that is, brings the jaws 97 and 98 over the projecting end 86 of the paper 9, the crank 47 engages the switch arm 103, moving the switch arm 103 to the vertical position as illustrated in Figure 5 to complete the electric circuit through the mercoid switch 105. As the crank 47 continues to rotate the switch 105 remains contacted until the paper has been folded in the box 2 and the arm 100 mounted on the shaft 17 rotates to engage the link 101 which, operating through the lever 102, causes the switch arm 103 to be moved out of contacting position, at which time the spring 106 causes the jaw 97 to move away from the jaw 98 and release the end of the paper.

The gripping jaw 97 includes a shaft 107 which is secured to the actuating arm 108 and is journaled in bearings 109 carried by the carriage 63. Mounted on a sleeve 110 secured to the shaft 107 in eccentric bushings are gripping feet 111 which, as the shaft 107 is rotated, grip the paper 9.

In order to guide the carriage 63 as it is reciprocated back and forth to grip and move or advance the paper over the top of the boxes 2, the carriage 63 is provided with two pair of spaced rollers 112 by which the carriage is guided as it travels back and forth along the track 113 supported by the frame of the machine.

The paper placing mechanism 6 embodied in my invention includes a pair of brackets 114 which are secured to the carriage 73. Secured to the lower ends of the brackets 114 are paper placing feet 115 which are pivotally connected to the ends of brackets 114 and are held in advanced position by means of springs 116 mounted on rods 117. The rods 117 are pivotally secured to the feet 115 at one end and pass through plates 118 at their upper end. The plates 118 are secured to brackets 119 to which edge folding pads 120 are secured.

As the paper placing mechanism 6 is moved downward with the carriage 73, the lower extent of the paper is stretched over the bottom of the box 2 and the two ends of the paper being still gripped, the paper is stretched tight in the box as the carriage 73 moved downwardly from the position illustrated in Figure 26 to the position illustrated in Figure 27. Before the edge engaging pads 120 come into engagement with the upper edges of the box 2, the paper is released from between the gripping jaws 97 and 98 at one end and is also cut by the paper cutting means 4 at its opposite end, permitting the two free ends to fall by gravity on the outside of the box at the ends or sides thereof, depending upon which of the paper placing means is under consideration. As the paper drops over the edge, it is folded on the edges of the box 2 by the edge folding pads 120, so that the overhanging portions of the paper lie close to the exterior walls of the box 2. The feet 115, during this operation, are pressed inwardly into the corners of the box to fold the paper at this point and to stretch the paper firmly over the bottom of the box. After this operation is completed, the carriage 73 is raised, raising the paper placing mechanism from the box 2, and box 2 is moved on by the intermittently operating carriage.

The paper cutting means includes the knife 79, which is secured to a holder 121. The knife 79 is guided during its vertical movement in guides 122. The holder 121 is secured to armature 123 of the paper cutter solenoid. As the current is supplied to the paper cutter solenoid, the knife 79 is moved downwardly to sever the paper and as the current is released from the solenoid in the manner as heretofore set forth, the knife 79 is raised by the action of the spring 124.

Having fully described my invention, it is to be understood that I do not wish to be limited to the details herein set forth, but my invention is of the full scope of the appended claims.

I claim:

1. In a machine for lining boxes with paper, the combination of means for conveying the boxes through a series of stations, means at one station for placing paper longitudinally in the boxes, and means at another station for placing papers transversely in the boxes.

2. In a machine for lining boxes with paper, the combination of means for conveying boxes intermittently through a series of stations, means at one station for placing paper longitudinally in the boxes, means at another station for placing paper transversely in the boxes, means at each station for cutting the paper to length to overhang the box, and means at each station for folding the paper at the edges of the boxes as the overhang of the cut paper falls.

3. In a machine for lining boxes, the combination of means for placing a lining in a box longitudinally of the box so that the paper overhangs the box edges, means for folding the paper to the corners of the box, means for placing a lining in the box transversely of the box, and means for folding the paper to the corners of the box.

4. In a machine for lining boxes, the combination of means for placing a lining in the box longitudinally of the box so that the paper overhangs the box edges, means for folding the paper to the corners of the box, and means for cutting the paper to a length to provide for the overhang.

5. In a machine for lining boxes, the combination of means for placing paper in a box longitudinally of the box, means for folding the paper so that the lower portion thereof lies flat to the bottom of the box, and portions thereof extend vertically of the box sides and so that the ends of the paper project from and overhang the sides of the box, and means for cutting the paper to provide for the overhang of the box.

6. In a machine for lining boxes, the combination of means for placing a lining in a box longitudinally of the box so that the lining overhangs the box edges and so that a portion of the lining lies flat to the bottom of the box, means for placing a lining in the box transversely of the box, so that a portion of the lining lies flat to the bottom of the box and so that portions of the paper overhang the ends of the box.

7. In a machine for lining boxes, the combination of a conveyor, means mounted at stations along the conveyor for placing paper longitudinally and transversely of the box, and for folding the paper to the corners of the box, and means for cutting the paper to a length sufficient to permit the paper to overhang the ends and sides of the box.

8. In a box lining machine, the combination of means for conveying a box longitudinally, a paper roll, means for placing a length of paper over the box as the box advances, means for folding the paper into the box to provide an overhang of paper at the ends thereof, means for cutting the paper, means for advancing the box to a second station, and means at the second station for folding a strip of paper into the box transversely of its length.

9. In a paper placing machine for boxes, means for advancing a box in the direction of its length, a paper feed roll, means operative as the box is advanced to feed a strip of paper over the box from the roll, means for stuffing the strip of paper in the box, and means for cutting the strip of paper from the roll after it is folded into position to provide an overhang of the paper of length sufficient to cover a material portion of the upper surface of material when packed in the box.

10. In a paper placing machine for boxes, means for advancing a box in the direction of its length, a paper feed roll, means operative as the box is advanced to feed a strip of paper over the box from the roll, means for stuffing the strip of paper in the box, means for folding the paper into the edges of the box along the bottom thereof, and means for cutting the strip of paper from the roll after it is folded into position to provide an overhang of the paper of length sufficient to cover a material portion of the upper surface of material when packed in the box.

11. In a paper placing machine for boxes, means for advancing a box in the direction of its length, a paper feed roll, means operative as the box is advanced to feed a strip of paper over the box from the roll, means for stuffing the strip of paper in the box, means for folding the paper into the edges of the box along the bottom thereof, means for cutting the strip of paper from the roll after it is folded into position to provide an overhang of the paper of length sufficient to cover a material portion of the upper surface of material when packed in the box, and means for clamping and folding the strip of paper to the upper edges of the box ends to cause the overhanging portion of the paper to fall downwardly.

12. In a paper placing device, the combination of means for intermittently advancing a box, means operative during the advance of the box to position a strip of paper over the box, means operative during the period of rest of the box to fold the paper into the box to have portions of the paper overhanging the box ends, means for cutting the paper to have the overhang, means for advancing the box in a direction at right angles to the first said advance, and means for folding a strip of paper into the box at right angles to the direction of the first strip.

13. In a paper placing device, the combination of means for intermittently advancing a box, means operative during the advance of the box to position a strip of paper over the box, means operative during the period of rest of the box to fold the paper into the box to have portions of the paper overhanging the box ends, means for cutting the paper to have the overhang, means for advancing the box in a direction at right angles to the first said advance, means for folding a strip of paper into the box at right angles to the direction of the first strip, means for folding the latter paper strip to the edges of the box within the box at the bottom thereof, and means for cutting the strip of paper when so folded.

14. In a paper placing machine, the combination of means for supporting a box, a paper roll, means for moving a length of paper from the roll over the box, paper placing means over the support, means for actuating the paper placing means to fold the paper within the box, and means actuated in timed relation with the paper placing means to cut the length of paper from the roll when placed.

15. In a paper placing machine, the combination of means for supporting a box, a paper roll, means for moving a length of paper from the roll over the box, paper placing means over the support, spring urged feet carried by the paper placing means to fold the paper in the edges of the box at the position of joinder of the bottom with the ends of the box, means for actuating the paper placing means to fold the paper within the box, and means actuated in timed relation with the paper placing means to cut the length of paper from the roll when placed.

16. In a paper placing machine, the combination of means for supporting a box, a paper roll, means for moving a length of paper from the roll over the box, paper placing means over the support, spring urged feet carried by the paper placing means to fold the paper in the edges of the box at the position of joinder of the bottom with the ends of the box, means carried by the paper placing means for clamping the paper to the upper edges of the box end members, means for actuating the paper placing means to fold the paper within the box, and means actuated in timed relation with the paper placing means to cut the length of paper from the roll when placed.

17. In a paper placing device, the combination of a support for a box, a paper roll, means for gripping the end of the paper of the roll, means for actuating the gripping means to move a length of paper over the box, means for positioning the paper in the box, and means for releasing the gripping means when the paper is positioned.

18. In a paper placing device, the combination of a support for a box, a paper roll, means for gripping the end of the paper of the roll, means for actuating the gripping means to move a length of paper over the box, means for positioning the paper in the box, means for cutting the paper, and means for releasing the gripping means when the paper is positioned.

19. In a paper placing device, the combination of a support for a box, a paper roll, means for gripping the end of the paper of the roll, means for actuating the gripping means to move a length of paper over the box, means for positioning the paper in the box, means for cutting the paper, means for releasing the gripping means when the paper is positioned, and means for returning the gripping means to the roll to again grip the end of the paper.

20. In a paper placing device, the combination of a support for a box, a paper roll, means for gripping the end of the paper of the roll, means for actuating the gripping means to move a length of paper over the box, means for positioning the paper in the box, means for releasing the gripping means when the paper is positioned, and means for holding the end of the roll of paper in position to be gripped by said gripping means.

21. In a paper placing device, the combination of a support for a box, a paper roll, means for gripping the end of the paper of the roll, means for actuating the gripping means to move a length of paper over the box, means for positioning the paper in the box, means for releasing the gripping means when the paper is positioned, means for holding the end of the roll of paper in position to be gripped by said gripping means, and means operable to resist the unwinding of paper from the roll as the gripping means move the length of paper over the box.

HENRY A. CAMPBELL.